United States Patent [19]

Rothe et al.

[11] 4,263,425

[45] Apr. 21, 1981

[54] PROCESS FOR PRODUCTION OF POLYESTER POLYMER FOR FOOD PACKING

[75] Inventors: Hans-Jochen Rothe; Peter Freund, both of Maintal; Werner Gey, Offenbach am Main; Helmut Heinze, Frankfurt am Main, all of Fed. Rep. of Germany

[73] Assignee: Zimmer Aktiengesellschaft, Fed. Rep. of Germany

[21] Appl. No.: 958,677

[22] Filed: Nov. 8, 1978
(Under 37 CFR 1.47)

Related U.S. Application Data

[63] Continuation-in-part of Ser. No. 823,282, Aug. 10, 1977, abandoned.

[51] Int. Cl.$^3$ .............................................. C08G 63/74
[52] U.S. Cl. .................................. 528/309; 264/236; 264/345; 264/347
[58] Field of Search ................. 264/85, 345, 347, 236; 528/309

[56] References Cited

U.S. PATENT DOCUMENTS

| | | | |
|---|---|---|---|
| 3,305,532 | 2/1967 | Middleburg et al. | 528/309 |
| 3,405,098 | 10/1968 | Heighton et al. | 528/309 |
| 3,547,890 | 12/1970 | Yamada et al. | 528/309 |
| 3,733,309 | 5/1973 | Wyeth et al. | 528/309 |
| 3,745,150 | 7/1973 | Corsover | 528/309 |
| 3,756,990 | 9/1973 | Jaeger et al. | 528/309 |
| 3,804,811 | 4/1974 | Rose et al. | 528/309 |
| 3,822,332 | 7/1974 | Hrach et al. | 528/309 |
| 3,960,817 | 6/1976 | Morawetz et al. | 528/309 |

*Primary Examiner*—Jeffery R. Thurlow
*Attorney, Agent, or Firm*—Allegretti, Newitt, Witcoff & McAndrews

[57] ABSTRACT

Polyethylene terephthalate having an acetaldehyde content of less than 2.5 ppm and suitable for packing of food and beverages intended for human consumption is produced by heating polyethylene terephthalate having an intrinsic viscosity of about 0.5—0.85 at a temperature of 180°–230° C., preferably 200°–220° C., for about 4 to 12 hours. The polyethylene terephthalate must not include more than 25 ppm of ester interchange catalyst or 20 ppm of phosphorous during this heating.

3 Claims, 1 Drawing Figure

ACETALDEHYDE PRESENT AS FUNCTION OF TEMPERATURE

ACETALDEHYDE PRESENT AS FUNCTION OF TEMPERATURE

PROCESS FOR PRODUCTION OF POLYESTER POLYMER FOR FOOD PACKING

CROSS REFERENCE TO RELATED APPLICATION

This application is a continuation in part of our copending application Ser. No. 823,282, filed Aug. 10, 1977, now abandoned the teachings of which are incorporated by reference herein.

BACKGROUND OF THE INVENTION

Linear polyesters especially polethylene terephthalate have been traditionally used for the production of textile filaments and fibers. In addition, there is a great market for and different uses of polyesters in the film industry. For example, linear polyesters are used as films for packing and packaging magnetic tapes, photographic films, strappings, electrical insulation, drawing paper, etc. When films are used for packing, in most cases, the film has no direct contact with foods. The shrinking properties and the mechanical strength of polyester films which have been used to wrap foods have been used in combination with other materials, such as paper or polyethylene films.

In the particular case of containers, such as bottles, which are designed to contain liquids such as pop or beer, which contain carbonic acid, linear polyesters are preferred material of construction.

It is known that every use demands special properties of the applied raw material. Further, it is known that special applications can impose special requirements.

One prerequisite for polyesters to meet when used for food packing is an optimal homogeneity for the polymer. Other characteristics, such as the viscosity of the product and the average molecular weight must be chosen carefully since these properties have an influence and relation to important properties such as the mechanical strength or the crystallinity. For many purposes, such as for the production of bottles, an optimal transparency and minimal yellow color in the polymer is required. Generally, properties which for any given purpose are of utmost importance can be absolutely secondary for another use.

For use as a packing material for food or beverage, a further factor is of utmost importance. This factor is that the polymer must not impart any taste or odor to the food product. It is known that due to the degradation or decomposition, polyesters form acetaldehyde which is noticed even in smallest concentration by its strong characteristic odor.

If acetaldehyde is present, it is an indication that there is some degradation which ultimately leads to color formation. Color formation is detrimental, i.e. the polymer must have a minimum of color. The requirement for bottles which shall contain beverages is that the concentration of acetaldehyde which diffuses from the walls of the bottles into the liquid must be exceptionally low. The tolerable limits depend on different factors such as the kind of beverage, shelf-life, etc. but also the methods used to determine the presence of acetaldehyde.

Acetaldehyde can be eliminated partially but not quantitatively from a polyester melt. For example, acetaldehyde can partially be eliminated if a stirred melt is treated at higher temperatures under vacuum. By this method, the tolerable minimum limits are not reached because the temperature of the melt is much too high and, therefore, parallel to the elimination of acetaldehyde previously produced, degradation occurs reforming additional acetaldehyde. Further, the elimination of acetaldehyde in a technically sound installation in economically feasible times more difficult as viscosity increases and the melt layer thickens.

Machines which produce bottles, other hollow bodies or other packings from polyesters can be fed with melt from a condensation reactor. In most cases, these machines will be fed with polyester chips. The plant site selection and transportation problems, however, determine the choice of feed to bottle making machines. Even if a melt is substantially free of acetaldehyde and, chips thus produced are subsequently melted again in order to produce bottles, acetaldehyde is again formed by degradation. The concentration of acetaldehyde in the melt used for the production of bottles depends on the conditions of the remelting of the chips. In any case, the concentration or content of acetaldehyde is unbearably high. Therefore, the amount of acetaldehyde which can diffuse into a liquid which is in contact with the bottles is also too high.

In addition, until recently, there has been no standard testing method for acetaldehyde in bottle polymers or in bottles themselves. The methods applied rely on chromatography (J. A. Myers, J. Chromatog. 99, 709–720 (1974)). The differences between different testing methods now applied by different institutes or individuals are found in the procedures used and in the manner in which the amount of acetaldehyde in the polymer is calculated.

Once the problem of acetaldehyde in polymers was known, many attempts to overcome this problem have been made. The goal was to find conditions under which a renewed formation of acetaldehyde during the remelting of chips in order to form bottles can be minimized. An assumption made in most cases was that the raw material for the production of bottles was polyester chips and that the production of these chips was done at a different site than the production of bottles.

SUMMARY OF THE INVENTION

The primary object of this invention is to produce bottles which have the least possible content of acetaldehyde to avoid imparting taste and odors to liquids contained in bottles made out of polyester. We found that the upper limit of the acetaldehyde concentration in the polymer chips should not exceed 2.5 ppm in order to achieve this goal.[1] The quality of the polymer and the conditions of producing it, the treatment of chips, and the conditions required for the production of the bottles must all be considered in minimizing acetaldehyde.

[1] The acetaldehyde content was determined by the following method based on gas chromatographic head space analysis: A sample of ground polyester (20–50 mesh) is brought into a glass flask of sufficient size sealed with a rubber septum. The air in the flask is replaced by nitrogen. The flask is heated to 150° C. in an oil bath and after 90 minutes a sample of headspace gas is extracted through the septum by a gastight syringe and injected into a gas chromatograph where it is analyzed at 160° C. with the aid of a column 1 m SS ⅛" I.D. Poropak Q 80/100 mesh.

A further object of this invention is to produce a polymer and, therefore, bottles which have as little yellow color as possible.

During our tests involving the production of bottles from different polymers, surprisingly we found that the acetaldehyde concentration in bottles from different batches of polymer differed markedly. Investigation of possible origin of these differences revealed that different procedures for drying the chips had been employed before making bottles. Therefore, the drying conditions were studied to determine which reactions are occurring while the chips are being dried.

It is known that acetaldehyde is eliminated from chips by diffusion during heating and, therefore, the concentration depends, according to the rules of physical chemistry, i.e., Fick's law, on the viscosity of the polymer and greatly on the temperature. In addition to viscosity and temperature, time as well as shape and size of chips has an effect on the elimination of acetaldehyde during heating. The influence of time is linear.

The specific surface area of the chips increases with decreasing particle size. For example, for cylindrical chips with a diameter to length ratio of 1, the specific surface is calculated according to the formula 6/diameter. Another factor of Fick's law is the diffusion path which decreases with decreasing particle size.

If the mass transfer, that is, the diffusion of acetaldehyde out of the chips is accomplished at low temperatures, there is no danger of additional thermal or thermal-oxidative degradation. It is also known that the amount of acetaldehyde which diffuses out of the chips increases with increasing temperature within certain limits. Further, it has been discovered that even heating polyester chips at temperatures of 160° C. over an uneconomical period of 60 hours is not enough to produce chips which can be transformed into bottles with a satisfactory low content of acetaldehyde. In order to investigate this problem, we performed a series of tests, explained below, which study the influence of temperature on the formation of acetaldehyde and the concentration of acetaldehyde in the polymer.

An analysis of the results obtained discovered that besides the thermal or thermal-oxidative degradation and in addition to the acetaldehyde already in the polymer before heating, there is a further latent source of acetaldehyde. This source is vinylester of the polymer which reacts with ethoxy-end groups of polyethylene terephthalate chains thus forming acetaldehyde. This type of reaction, which yields acetaldehyde, is substantially completed at 200° C. If the temperature is high enough, then this reaction of split molecular chains with vinyl-end groups will react yielding acetaldehyde. If this reaction does not occur during heating, it will occur during remelting of the chips giving a high amount of acetaldehyde. If this additional amount of acetaldehyde is formed and eliminated by diffusion during heat treatment, then the acetaldehyde content in the bottles is reduced to the amount which had not been eliminated during heating plus the amount of acetaldehyde formed by thermal or thermal-oxidative degradation during remelting of the chips. Therefore, the temperature of heat treatment must not be too high to avoid forming too much acetaldehyde by thermal or thermal-oxidative degradation. Further great care must be given to the conditions used for remelting this polymer.

Linear polyesters, especially polyethylene terephthalate, differ in their final, exact chemical composition depending on the exact process used to produce the polymer. On one hand the dimethylester of terephthalic acid can be ester interchanged with ethylene glycol to produce the ester. On the other hand, free terephthalic acid can be esterified with ethylene glycol to produce the ester.

The ester interchange reaction is carried out in the presence of ester interchange catalysts, such as salts of the metals calcium, manganese, cobalt, titanium and zinc. After the ester interchanging reaction is finished, the action of these catalysts will be blocked by the addition of phosphorous compounds such as phosphates, phosphines or other phosphorous containing compounds. Polyethylene terephthalate produced in this way thus includes, in addition to one or more of the metal catalysts, phosphorous containing compounds.

Polyethylene terephthalate produced from free terephthalic acid contains neither these metal catalysts nor the phosphorous blocking compounds.

Both types of polyethylene terephthalate thus behave differently with respect to the content and reproduction of acetaldehyde during the remelting procedure.

It was discovered that the acetaldehyde concentration of polyethylene terephthalate having a concentration of phosphorous which exceeds 20 ppm cannot be lowered to less than 2.5 ppm by heat treatment at 200° C. within 8 hours.

Furthermore, it was discovered that different ester interchange catalysts produce different concentrations of acetaldehyde in the solidified polymer as well as on the acetaldehyde concentration in the heat-treated polyethylene terephthalate.

Accordingly, the present invention relates to a special heat treatment in a process to produce polyester chips for bottles or food packing to provide a product containing less than 2.5 ppm acetaldehyde and an intrinsic viscosity of 0.7–0.95. First, the polyester chips must have an instrinsic viscosity in the range of 0.5 to 0.85 (where the intrinsic viscosity is measured at 25° C. in a solvent containing 60% of phenol and 40% of tetrachloroethane, the polymer being present in a concentration of 0.5 g/100 ml). Second, nitrogen or another inert gas is employed as a heating medium in a continuous or discontinuous operating heater. The operation for removing the acetaldehyde must be accomplished in a period of time of 4–12 hours, the exact time selected as a function of the temperature, the intrinsic viscosity of the chips and the size and shape of the granulate. The temperature must not be lower than 180° C. in order to start the reaction of vinyl-end groups with ethoxy-groups, and must not be higher than 230° C. in order to avoid a strong degradation. Third, the density of the chips must be in the range of about 1.378–1.400. Fourth, the chips must contain less than 25 ppm ester interchange catalyst and less than 20 ppm phosphorous.

DETAILED DESCRIPTION OF THE INVENTION

Figure 1:
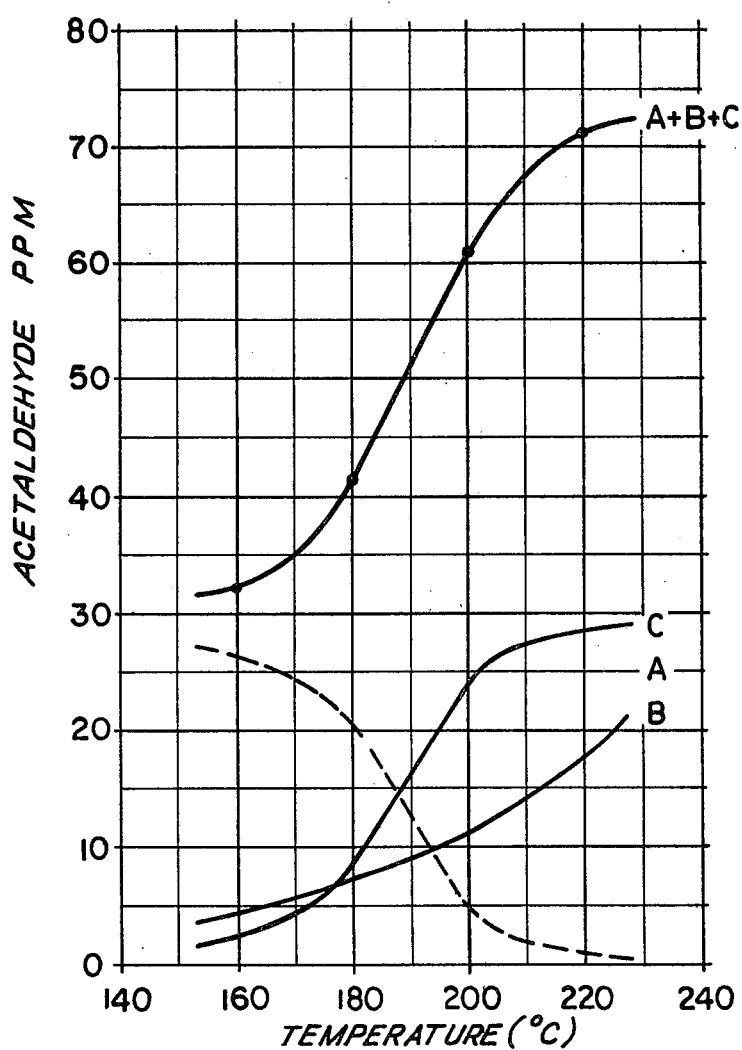

In each of the following examples, 13 g of polyethylene terephthalate chips having an intrinsic viscosity of 0.85 and a carboxyl group content of 15 equivalent/$10^6$ g was dried for 3 hours at 200° C. in a nitrogen stream to reduce the water content to less than 0.003% by weight.

The chips were then rapidly transferred under a nitrogen blanket to a stainless steel pipe of 10 mm diameter, preheated to 280° C. After the stainless steel pipe was quickly filled, it was closed quickly with a piston. The polymer was then extruded, 10 minutes after been melted and heated to 280° C., into a vessel purged with nitrogen to yield a cable of 1 mm diameter.

EXAMPLE 1

8 g of freshly extruded polyester cable was cut under a blanket of nitrogen into pieces 2–3 cm long and placed in an Erlenmeyer flask. This Erlenmeyer flask was equipped with a silicone rubber disk (Septum) fastened to the flask by means of a screw cap through which samples of gas were withdrawn for gas analyses. This flask was also provided with a stirrer-disk, the support for which passed through a glass plug which was moved up and down by a magnet in 4 second periods. The Erlenmeyer flask was placed in an oil bath until the oil reached the lower edge of the plug and heated to 160° C. The nitrogen passing over the pieces of the cable (chips) was maintained at a constant temperature of 160° C.±1° C. After 1½ hours, three samples of gas were extracted at intervals of 3 minutes, from the gas space over the chips and analyzed for acetaldehyde by means of gas chromatography.

The gas space over the chips was then rinsed or purged vigorously for 90 seconds with nitrogen. After 1½ hours at 160° C., 3 samples of gas were again extracted and analyzed for acetaldehyde. This procedure was repeated two additional times at intervals of 1½ hours each. As a result, four average values were obtained after 1½, 3, 4½ and 6 hours of heating at 160° C. The results obtained are set forth in Table I. The amount of acetaldehyde found in the gas space was calculated on the amount of polyester (8 g) originally present and is expressed in ppm by weight.

EXAMPLE 2

Example 1 was repeated except that the freshly extruded polyester cable or chips were heated for 6 hours at 180° C. instead of at 160° C. The results obtained are set forth in Table I.

EXAMPLE 3

Example 1 was repeated except that the polyester chips or cable were heated 6 hours at a temperature of 200°±1° C. instead of 160° C. The results obtained are set forth in Table I.

EXAMPLE 4

Example 1 was repeated except that the polyester chips or cable were heated for 6 hours at 220°±1° C. instead of 160° C. The results obtained are set forth in Table I.

The gas chromatographic anaysis for acetaldehyde in the gas space over the chips was performed with a Perkin Elmer analyzer (model F2O B, with FID) using a 1 m column packed with Parapak Q and maintained at 160° C. Gas samples of 2 ml each were injected into the analyzer. The calibration was done with the aid of an exponential dilution flask. The average of the aldehyde content found and calculated on polyester are reproduced in Table I.

TABLE I

|  | Example No. | | | |
| --- | --- | --- | --- | --- |
|  | 1 | 2 | 3 | 4 |
| Temperature (°C.) | 160 | 180 | 200 | 220 |
| Acetaldehyde (ppm) after | | | | |
| 1. 1½ hrs. | 23.6 | 30.4 | 45.3 | 51.6 |
| 2. 1½ hrs. | 4.9 | 6.0 | 7.9 | 9.4 |
| 3. 1½ hrs. | 2.4 | 3.2 | 4.6 | 5.6 |
| 4. 1½ hrs. | 1.3 | 1.8 | 3.2 | 4.2 |
| Sum (ppm) | 32.2 | 41.4 | 61.0 | 70.8 |

In these examples, it is assumed that the acetaldehyde content and other characteristics of the polyester cable used in each of the Examples 1-4 were identical. A critical analysis of the results plotted in FIG. 1 and set forth in Table I shows that the acetaldehyde content from the sample is principally composed of 3 components which are:

(A) The original acetaldehyde content of the sample which was about 25 ppm, (B) The freshly formed acetaldehyde formed during the 6 hour heating because of thermal degradation of the polyester. This freshly formed acetaldehyde is present in an amount nearly proportional to the 4th measurement and can be calculated on this basis, (C) The amount of acetaldehyde formed during the 6 hours heating, particularly during the first 1½ hours due to the reaction of intermediate products which were already present in the sample used.

The last mentioned portion (C) is the key to solving the primary object of this invention. The intermediate products in question are believed to be primarily vinylesters which are formed by thermal splitting of polyester chains.

Surprisingly, we found that these intermediate products react more or less completely and, at temperatures over 200° C., as fast as the acetaldehyde is being produced. This is demonstrated in FIG. 1.

In FIG. 1, the dotted curve shows the respective residual content of the intermediate compounds expressed as acetaldehyde. If the polyester is melted again, these intermediate products react and produce at the heating temperature, the acetaldehyde amounts indicated. This amount is added to the amount due to thermal degradation of the polyester.

With an increase of the treatment temperature from 200° C. up to e.g. 240° C., increasingly undesirable reactions or conditions occur.

These include:

(A) The new formation of acetaldehyde due to progressive thermal and possibly thermal-oxidative degradation, (B) The tendency of chips to agglomerate which, in turn, requires the use of highly sophisticated equipment to practice the process, (C) An increasing consumption of material and energy for the heating of nitrogen and for the purification and recycling of the inert gas.

As a result, the conditions for heat treatment must be chosen so that the maximum amount of intermediate products present which can form acetaldehyde must react and the resultant acetaldehyde eliminated from the chips during this operation. Only then would the amount of newly formed acetaldehyde be minimized during the remelting of the chips to produce e.g. bottles. Further, the temperature of heating must be chosen so that thermal or thermal-oxidative degradation is avoided as much as possible since these degradations lead to detrimental quality, particularly where color is concerned.

EXAMPLE 5

Polyester chips were heated for a period of 6 hours in a cylindrical pipe in the presence of a nitrogen stream (1 kg nitrogen/1 kg polyester) at 200° C.

An acetaldehyde determination was made in a manner analogous to the technique described above where the chips had been heated under fresh nitrogen two times at 1½ hours at a temperature of 180° C. The acetaldehyde content obtained, calculated on polyester, was only 1.08 and 0.62 ppm while the untreated chips gave values of 21.8 and 4.8 ppm acetaldehyde.

EXAMPLE 6

Example 5 was repeated except that the chips were heated in a nitrogen stream at 200° C. and were then melted in a few seconds in a 10 mm diameter stainless steel tube maintained at 270° C. in a manner similar to Examples 1-4. The polymer was then spun to a cable of 1 mm diameter. After this, the acetaldehyde content was determined as in Example 5. The acetaldehyde content was 4.2 and 2.2 ppm.

New acetaldehyde was formed but in an amount which was considerably less than the acetaldehyde content of the original chips.

In a second series of examples the influence of ester interchange catalyst and phosphorous in the concentration of acetaldehyde in the heat treated polyethylene terephthalate was demonstrated.

A heatable, cylindrical tube-reactor with a diameter of 125 millimeters and a length of 200 millimeters is filled with 1500 grams of cylindrical polyethylene terephthalate chips having a diameter of 1.5-2.0 millimeters and a density in the range of 1.37-1.39. Oxygen free nitrogen was blown through the chips in an amount of 1000-2000 liters per hour at a temperature of 220° C. from the bottom of the reactor to the surface of the chip-layer.

After the chips reached the temperature of 220° C., the chips were treated for over 6 hours at this temperature. The chips were then cooled by cold nitrogen to a temperature of 50° C. In this manner, seven different samples were freed from acetaldehyde. From each sample, 8 grams were treated, as described in Example 1, at a temperature of both 150° and 200° C. for three hours. The concentration of acetaldehyde was then determined. These samples differed in the type and concentration of ester interchange catalysts and in the concentration of phosphorous. The results of these examples are set forth in Table 2.

provide the low aldehyde values required for packing foods.

DISCUSSIONS OF DATA

It has been surprisingly discovered that there is a temperature and catalyst concentration range wherein the acetaldehyde content of the end product, e.g. a bottle is nearly constant and minimal.

This minimum is reached at temperatures which are higher than are employed in normal polyester drying but which at the same time are less than those used in industrial solid state condensation. There are polycondensation reactions in the temperature range of 180°-230° C., preferably 200°-220° C. which give an additional positive effect to our invention. This positive additional effect consists of an increase of the intrinsic viscosity by a value of 0.05-0.2 units of intrinsic viscosity, the exact increase depending on temperature, chip size, starting viscosity and residence time. This increase of the intrinsic viscosities improves the strength of the material and decreases the tendency to crystallize. Crystallization is detrimental since the final product, e.g. bottle, can become turbid.

The present process produces polymer which is in conformity with the strict controls and regulations of regulatory bodies such as the FDA and is, therefore, suitable for the food industry.

What is claimed is:

1. In a process for the production of polyethylene terephthalate plastic for the packing or bottling of food products for human consumption wherein there is direct contact between the food and the plastic and as a result, the presence of acetaldehyde in the product is undesirable, the improvement which comprises heating

TABLE 2

| | Experiment No. | | | | | | | |
|---|---|---|---|---|---|---|---|---|
| | 1 | 2 | 3 | 4 | 5 | 6 | 7 | 8 |
| Type of ester interchange catalyst | none | none | none | Ca | Mn | Mn | Co | Zn |
| Concentration of ester interchange catalyst, ppm | 0 | 0 | 0 | 150 | 70 | 120 | 66 | 76 |
| Concentration of Phosphorous, ppm | 0 | 0 | 14 | 83 | 61 | 23 | 90 | 46 |
| Concentration of Carboxyl Groups, Aqu/$10^6$g | 15.4 | 27.4 | 25.5 | 28.2 | 18.9 | 26.0 | 32.5 | 24.8 |
| Intrinsic Viscosity, dl/g | 0.60 | 0.69 | 0.59 | 0.70 | 0.64 | 0.83 | 0.67 | 0.61 |
| Concentration of Acetaldehyde Before Heat Treatment, ppm | 18.3 | 53.0 | 102 | 108 | 83 | 126 | 135 | 98 |
| Concentration of Acetaldehyde After Heat Treatment, ppm | 0.5 | 0.4 | 1.1 | 7.5 | 4.7 | 3.2 | 6.4 | 4.8 |

This data shows that in addition to the physical conditions present during the heat treatment e.g. temperature, time, inert gas stream, size and shape of chips, the chemical properties especially the content of ester interchange catalyst and phorphorous compounds effect the removal of acetaldehyde and the end concentration of acetaldehyde in the polyethylene terephthalate.

Concentration higher than 25 ppm of ester interchange catalyst and concentrations of phosphorous higher than 20 ppm prevent attaining acetaldehyde concentrations of less than 2.5 ppm in the final polyethylene terephthalate.

Reaction conditions, described in solid state polycondensation patents, e.g. U.S. Pat. Nos. 3,756,990 and 3,960,817, although inherently able to lower the acetaldehyde content in polyethylene terephthalate, cannot polyethylene terephthalate chips containing acetaldehyde and in a solid state having an initial intrinsic viscosity in the range of 0.5-0.85 when measured at 25° C. with 0.5 g polyethylene terephthalate per 100 ml of solvent of 60% phenol and 40% tetrachloroethane, a density in the range of 1.378-1.400, a concentration of ester interchange catalyst in the chip of less than 25 ppm and a phosphorous concentration of less than 20 ppm at a temperature of about 180°-230° C. in an inert atmosphere for about 4-12 hours to reduce the acetaldehyde content to below 2.5 ppm in the chips.

2. A process according to claim 1 wherein said polyethylene terephthalate is heated at a temperature of about 200°-220° C.

3. A process according to claim 1 wherein said inert gas is nitrogen.

* * * * *